US010297985B2

(12) United States Patent
Blasbalg et al.

(10) Patent No.: US 10,297,985 B2
(45) Date of Patent: May 21, 2019

(54) MODULAR ELECTRICAL DEVICES AND METHODS FOR ASSEMBLING AND MOUNTING THE SAME

(71) Applicant: ABB Schweiz AG, Baden (CH)

(72) Inventors: Paul Blasbalg, Barrington, RI (US); Andrea Quarteroni, Azzano San Paolo (IT)

(73) Assignee: ABB Schweiz AG, Baden (CH)

( * ) Notice: Subject to any disclaimer, the term of this patent is extended or adjusted under 35 U.S.C. 154(b) by 0 days.

(21) Appl. No.: 15/796,308

(22) Filed: Oct. 27, 2017

(65) Prior Publication Data

US 2018/0069382 A1 Mar. 8, 2018

Related U.S. Application Data

(63) Continuation of application No. PCT/US2016/029360, filed on Apr. 26, 2016.

(60) Provisional application No. 62/153,069, filed on Apr. 27, 2015.

(51) Int. Cl.
*H02B 1/20* (2006.01)
*H01H 71/08* (2006.01)
*H01R 25/14* (2006.01)
*H01H 11/00* (2006.01)

(52) U.S. Cl.
CPC .............. *H02B 1/20* (2013.01); *H01H 71/08* (2013.01); *H01R 25/145* (2013.01); *H01H 11/0031* (2013.01); *H01H 71/082* (2013.01); *H01H 2011/0037* (2013.01); *H01R 25/147* (2013.01)

(58) Field of Classification Search
None
See application file for complete search history.

(56) References Cited

U.S. PATENT DOCUMENTS

| 3,356,906 | A | 12/1967 | Lamb et al. |
| 4,631,634 | A | 12/1986 | Raabe et al. |
| 4,941,841 | A | 7/1990 | Darden et al. |
| 5,640,295 | A * | 6/1997 | Harris ...................... H02B 1/04 361/644 |
| 5,894,405 | A | 4/1999 | Fleege et al. |
| 6,008,459 | A | 12/1999 | Faber et al. |
| 6,205,019 | B1 | 3/2001 | Krom |
| 6,274,833 | B1 | 8/2001 | Moody |
| 6,278,605 | B1 | 8/2001 | Hill |
| 7,365,964 | B2 | 4/2008 | Donahue, IV |
| 8,284,542 | B2 | 10/2012 | Siebels et al. |

(Continued)

OTHER PUBLICATIONS

International Search Report and Written Opinion, PCT/US2016/029360, ABB Technology AG, Jun. 23, 2016, 12 pages.

*Primary Examiner* — Courtney L Smith
(74) *Attorney, Agent, or Firm* — Taft Stettinius & Hollister LLP; J. Bruce Schelkopf

(57) ABSTRACT

An electrical distribution apparatus has a bus bar assembly, a protective shroud, and electrical devices mounted therein. The electrical devices have a main housing, a line side housing for line side connectors and jaws, a securement portion for mounting the electrical device in a back pan of the electrical distribution apparatus. A method for mounting the electrical device in the electrical distribution apparatus is provided. A method for forming the line side connector assembly and installing the line side connector assembly to the main housing of the electrical device is also provided.

20 Claims, 12 Drawing Sheets

(56) References Cited

U.S. PATENT DOCUMENTS

| | | | | |
|---|---|---|---|---|
| 9,263,860 B2* | 2/2016 | Crooks | ............... | H02B 1/042 |
| 9,312,668 B2* | 4/2016 | Faber | ............... | H01H 9/22 |
| 9,787,068 B2* | 10/2017 | Rota Martir | ............... | H02B 11/24 |
| 2008/0002339 A1* | 1/2008 | Dixon | ............... | H01H 1/5866 |
| | | | | 361/673 |
| 2008/0198536 A1 | 8/2008 | Ewing et al. | | |
| 2009/0088029 A1* | 4/2009 | Robinson | ............... | H01H 71/08 |
| | | | | 439/716 |
| 2010/0301980 A1* | 12/2010 | Bergamini | ............... | H01F 38/30 |
| | | | | 336/61 |
| 2010/0304590 A1* | 12/2010 | Frassineti | ............... | H01H 1/58 |
| | | | | 439/196 |
| 2012/0200986 A1* | 8/2012 | Maloney | ............... | H01H 71/08 |
| | | | | 361/624 |

* cited by examiner

MODULAR ELECTRICAL DEVICES AND METHODS FOR ASSEMBLING AND MOUNTING THE SAME

FIELD OF INVENTION

The present application is directed to modular electrical devices for mounting in a panelboard, switchboard or another type of electrical equipment having a bus bar assembly.

BACKGROUND

Electrical distribution equipment provides power to electrical devices such as circuit breakers that are used to protect various loads. Known methods of assembling and connecting electrical devices in electrical distribution equipment require multiple steps and in some cases, special tools. There is a need in the art for an improved method and assembly for electrical devices mounted within an electrical distribution apparatus.

SUMMARY

In many cases it is desirable for electrical devices, such as circuit breakers, to have protective features that prevent foreign objects from coming into contact with portions of the device that are electrically charged. For example, the bus bars in a panel board may be provided with a shroud to prevent inadvertent contact with the bus bars. The circuit breaker may also be provided with teeth surrounding the jaws that connect to the bus bars to prevent inadvertent contact with the jaws. These types of protective features are commonly known as IP2X rated.

One problem with prior circuit breakers with such protective features is that they have been designed and manufactured as special purpose circuit breakers that are not easily configurable in the field for use in various types of panel boards. The modular electrical device described herein overcomes these problems by being configurable in the field by a field installer as desired. That is, a field installer can convert a conventional circuit breaker without bus bar jaws and protective teeth in the field to an IP2X circuit breaker with bus bar jaws and protective teeth. The allows the field installer greater flexibility to service a variety of panel boards and allows the field installer to reduce the number of replacement parts that must be stocked.

BRIEF DESCRIPTION OF THE DRAWINGS

In the accompanying drawings, structural embodiments are illustrated that, together with the detailed description provided below, describe exemplary embodiments of an assembly and a method for mounting an electrical device, in an electrical distribution apparatus. One of ordinary skill in the art will appreciate that a component may be designed as multiple components or that multiple components may be designed as a single component.

Further, in the accompanying drawings and description that follow, like parts are indicated throughout the drawings and written description with the same reference numerals, respectively. The figures are not drawn to scale and the proportions of certain parts have been exaggerated for convenience of illustration.

DETAILED DESCRIPTION

Figure 1:
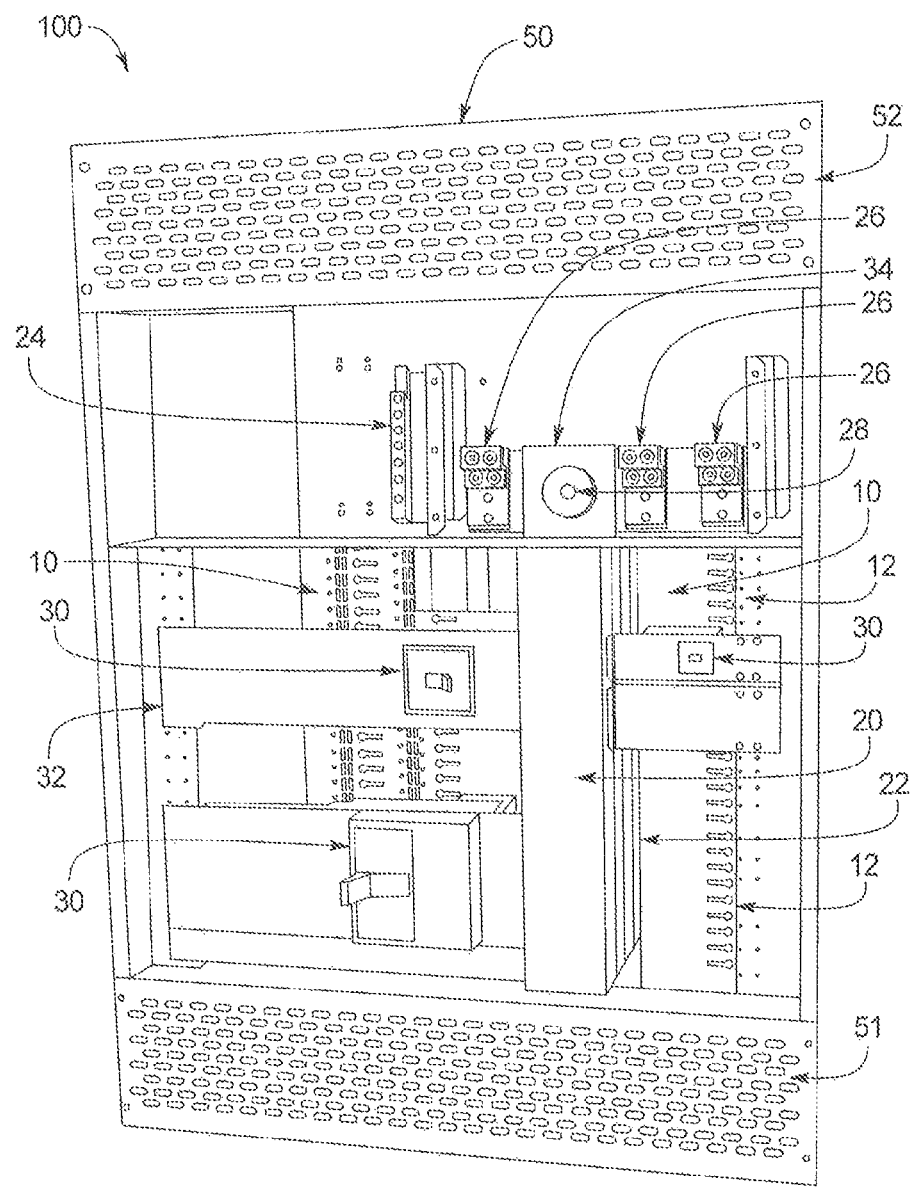
FIG. 1 is a front perspective view of an electrical distribution apparatus embodied in accordance with the present disclosure.

With reference to FIG. 1, an exemplary electrical distribution apparatus, a panelboard 100 having a bus bar assembly 20 and a shroud 22, is shown. It should be appreciated that the bus bar assembly 20 and shroud 22 can be used in panelboards 100, switchboards, switchgear, power distribution units, and any other electrical distribution apparatus such as applications that utilize electrical devices such as single- and group-mounted molded case circuit breakers, contactors, main lug only devices, fuse switches, surge protective devices and other electrical devices. Low voltage, as used herein, refers to voltages that do not generally exceed 600 volts alternating current, or 1200 volts direct current.

The panelboard 100 has an enclosure 50 in which the bus bar assembly 20 is vertically mounted. The enclosure 50 of the panelboard 100 has top, bottom, side and rear walls. The front of the enclosure is enclosed by a front wall or front door (not shown). Mounted vertically in the enclosure 50 is the bus bar assembly 20. The bus bar assembly 20 has at least one bus bar 19 and each of the bus bars are separated by insulating members 15 as depicted in FIG. 1B.

In the embodiment shown in FIG. 1, the bus bar assembly 20 has the shroud 22 that provides a protection level of IP2X in accordance with ingress protection ratings under international standard IEC 60529. The ingress protection ratings, and more particularly the IP2X ratings, are directed to the prevention of the intrusion of objects such as tools or human fingers into the live connections of the electrical equipment.

Figure 1A:
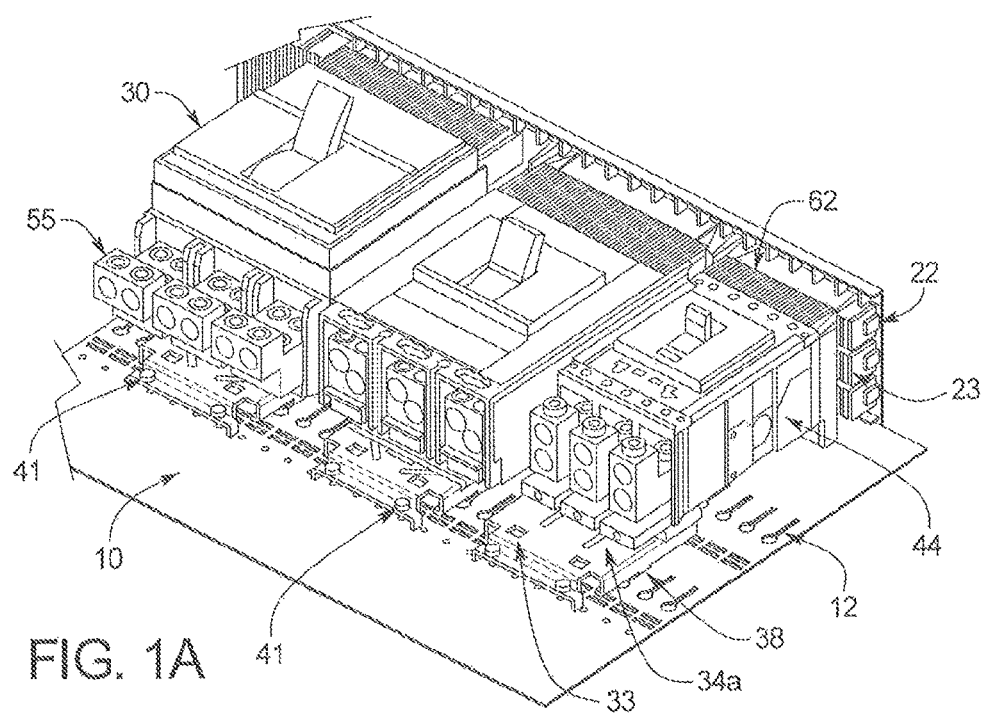
FIG. 1A shows exemplary electrical devices connected through a shroud to bus bars of the bus bar assembly of the electrical distribution apparatus.
Figure 1B:
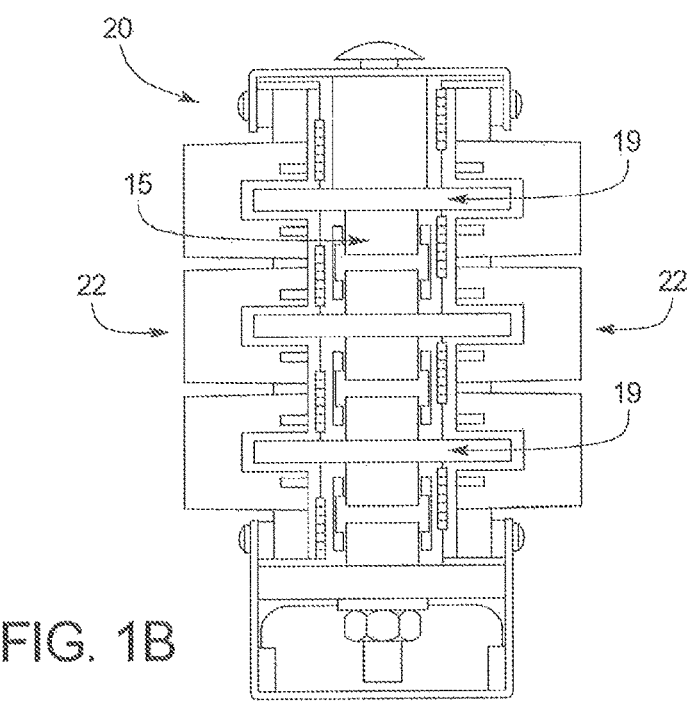
FIG. 1B is a top sectional view of the bus bar assembly having the shroud.

As shown in FIG. 1B, the bus bar assembly 20 shroud 22 covers the edges of the bus bars 19 except for connection surfaces for the electrical device 30 jaws 60. In this manner, the shroud 22 is formed of a network of connected and spaced-apart recesses 23 that provide slots for receiving jaws 60 of a line side connector 66 of the electrical device 30. One example of an electrical device 30 for use with the bus bar assembly 20 is the Tmax XT circuit breaker, available from the assignee of the present application. The shroud 22 and bus bar assembly 20 are described in more detail in U.S. Patent Publication No. 20140315401, the contents of which are incorporated by reference in their entirety herein.

The panelboard 100 enclosure 50 has bottom and top vents 51, 52 for permitting air flow from the bottom vent 51 of the enclosure through ventilation spaces in the bus bar assembly 20 and ventilation openings in the housings of the mounted electrical devices 30 to the top vent 52 the enclosure 50. The panelboard 100 has main incoming lugs 26 for each phase for connecting to the incoming power source such as a utility, insulators 34 that are part of a connection set 28 between the bus bar assembly 20 and incoming bus work or cables that connect the bus bar assembly 20 to the incoming power source. In another embodiment, not shown, the main incoming lugs 26 can be replaced with an incoming main circuit breaker (not shown). In yet another embodiment, the main incoming lugs 26 can be eliminated and the incoming power source can be connected and fed through an electrical device 30 that makes connection with the bus bar assembly 20.

The connection set 28 provides a clamping pressure on the bus bar assembly using a fastener placed through an opening in the bus bars and the insulators 34. The panelboard 100 also has a ground bar 24. It should be understood by a person having ordinary skill in the art that in a three-phase, four wire installation of the electrical distribution apparatus, a neutral bar is provided and is mounted apart from the bus bar assembly 20 in the enclosure 50.

The panelboard 100 has a back pan 10 to which the electrical devices 30 are mounted using mounting positions 12 that are spaced to allow for the alignment and connection of each electrical device line side jaws 60 to corresponding bus bars of the bus bar assembly 20. Covers 32 are provided for the electrical devices 30, particularly circuit breakers, mounted in the panelboard 100.

With reference now to FIG. 1A, the electrical devices 30 are shown mounted to the bus bar assembly 20 through the shroud 22. The electrical devices 30 are of different frame sizes and each have a line side housing 62 (shown in FIGS. 3B, 5, 7, and 8), a main housing 44, a load side housing 42 (removed in FIG. 1A but shown in FIG. 5), load side lugs 55 that are enclosed by load side housing 42, and a securement portion 34a. The line side housing 62, main housing 44, load side housing 47, line side cover 72, and like components are preferably made from an electrically insulated plastic material. The securement portion 34a has an indexing key 38 extending downwardly therefrom and a tab 33 having a slot for interfacing with a tool such as a standard flathead screwdriver.

It is noted that the terms "line side" and "load side" can be interchanged with each other. For example, where the electrical current of a device in the system flows in a direction opposite from that of other similarly mounted devices, the "line side" may become the "load side" and vice versa. This is commonly referred to as a "back fed" device. Accordingly, an alternative term for "line side" as used herein is the term "bus stack." That is, a modular line side connector 78 and other like terminology could also be referred to as a modular bus stack connector 78.

Figure 2:
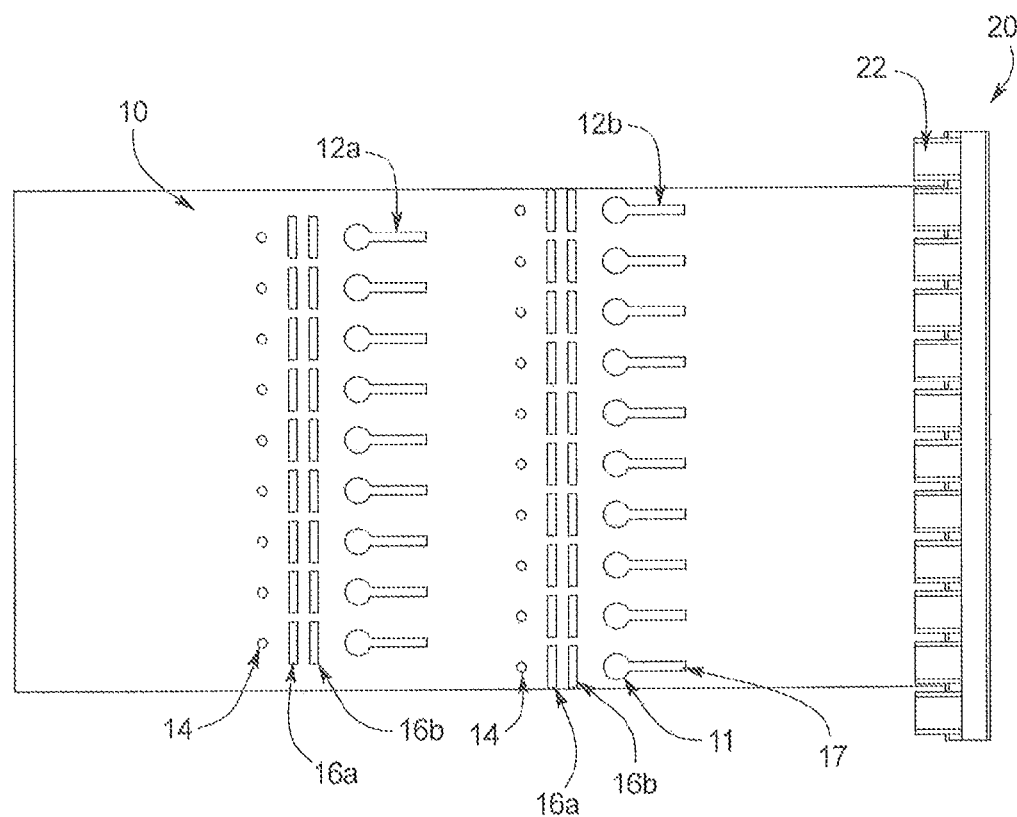
FIG. 2 shows the back pan of the electrical distribution apparatus of FIG. 1 in more detail.

Referring now to FIG. 2, the back pan 10 of the panelboard 100 is shown in more detail. The back pan 10 has mounting positions 12 that are openings 11 extending into slots 17. In one embodiment, a first column of mounting positions 12a are offset by a half space from a second column of mounting positions 12b. In other embodiments, the first and second columns of mounting positions 12a, 12b are aligned, and the mounting positions 12a, 12b occupy the same row. It should be understood that the columns of mounting positions 12 may be offset by other distances besides a half space from other columns of mounting positions and that the alignment of the mounting positions 12 depends on the frame size and configuration of the electrical devices 30 mounted to the back pan 10. The back pan 10 has slots 16A, 16B for engagement with a tool first end and alignment with a tab 33 of the securement side of the electrical device 30 during insertion of the electrical device 30 line side jaws 60 onto the respective bus bars 19.

Figure 3:
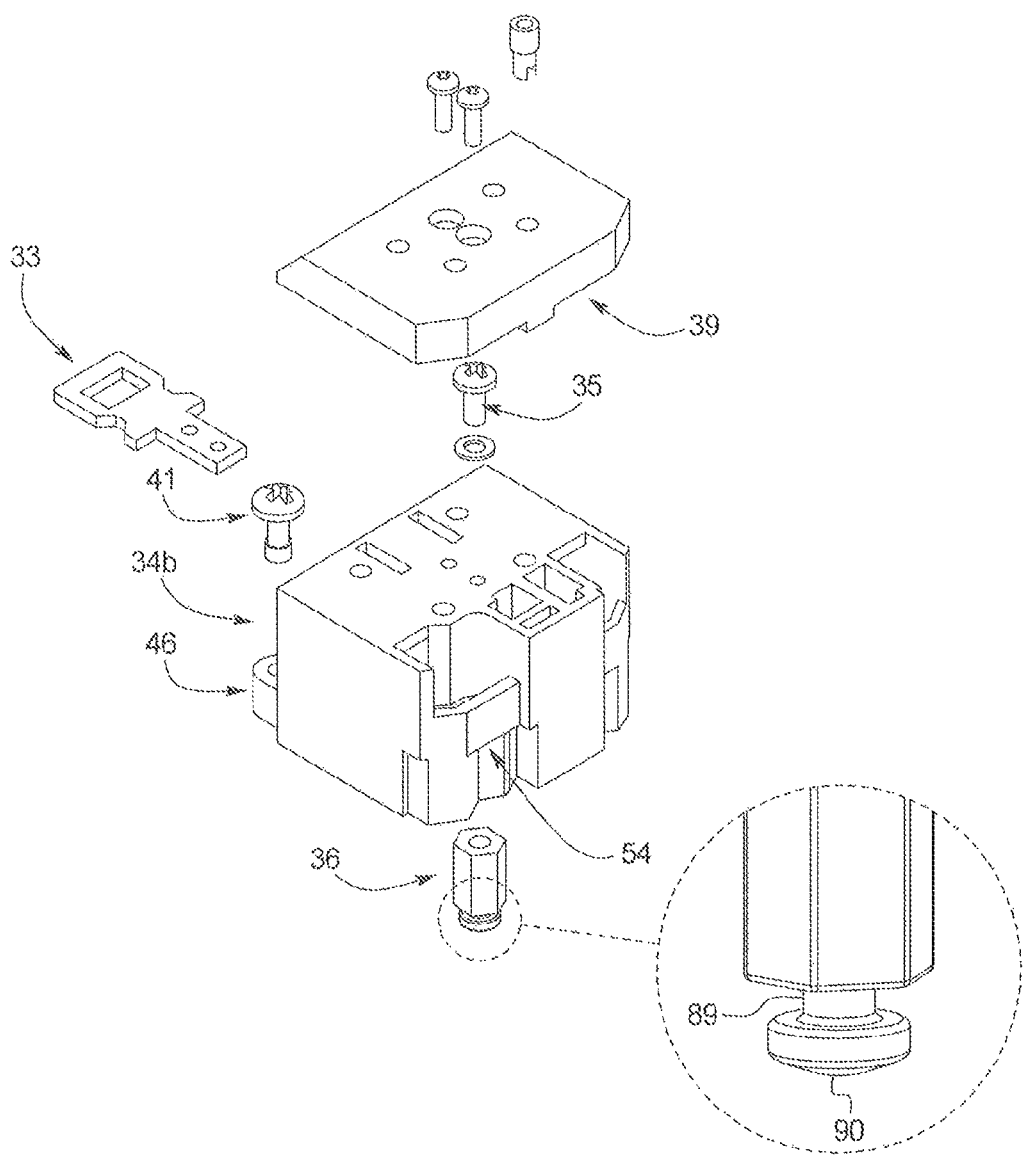
FIG. 3 is an exploded view of a securement side of the electrical device, having a mounting button for mounting the electrical device in the back pan of the electrical distribution apparatus.

With reference now to FIG. 3, the electrical device 30 main and line side housings 44, 62 are removed and only the mounting elements 33, 36, 46 of the securement portion 34b are shown in an exploded view. The securement side 34b has a tab 33 with an opening for the insertion of the tool first end and movement of the electrical device 30 forward onto the bus bar assembly 20. The opening of tab 33 corresponds to the desired slots 16a, 16b in the back pan 10. The securement side 34b has a button 36 extending downwardly therefrom for securing the electrical device 30 to the desired position in the back pan 10. However, in the present embodiment, the indexing key 38 is not utilized.

The button 36 has a first end and a second end, the first end having a smaller circumference than the second end. In one embodiment, the button 36 is a cylindrical part having a notch 89 formed around the circumference of the button 36 for engaging with the slot 17 of the desired mounting position 12. When the button 36 is notched 89, the first end of the button 36 may have beveled edges 90 to permit engagement with the opening 11 of the corresponding mounting position 12.

The button 36 is a machined metal part or a molded plastic part. Although the button 36 is shown as having a hexagonal second end in FIGS. 3, 3A, and 4, it should be understood that any shape is possible including circular, octagonal and square. The button 36 extends from the securement portion 34b of the electrical device 30 from an opening where the button 36 is retained by fastener 35. In one embodiment, the button 36 is mounted in the securement portion so that about one fourth of the button 36 is obscured by the securement portion 34b of the electrical device 30.

In one embodiment, an extension 39 is provided to give electrical devices 30 of certain frame sizes additional height when mounted to the back pan 10. The additional height provided by the extension 39 allows the jaws 60 on the line side to be aligned with the corresponding bus bars of the bus bar assembly 20.

The electrical device 30 is mounted in a de-energized panelboard 100 by using the following method. The first step of the method is to place the first end of the button 36 into the corresponding aperture 11 on the back pan 10. Then, the electrical device 30 is moved along the mounting position 12 slot 17 until the button 36 first end or notch has entered and moved partially into the slot 17. At this point, the teeth 64 of the line side connector housing 62 slightly overlap the shroud 22 and the jaws 60 are flush with the bus bars of the bus bar assembly 20, but not yet connected to the bus bars. At this point of the connection, the shroud 22 and button 36 support the weight of the electrical device 30.

The tool first end is then placed into the tab 33 of the securement portion 34a, 34b, and a corresponding slot 16A on the back pan 10. The tool second end, furthest from the slot 33, is then moved in a direction perpendicular and towards the bus assembly 20. This motion results in a levering action that advances the electrical device 30 in the direction of the bus assembly 20 and overcomes the spring force resistance of the jaw(s) 60. The jaws 60 spread and are moved over and onto the corresponding bus bar 19 connection surfaces.

Depending on the size and type of the electrical device 30, this action may need to be repeated to advance the electrical device 30 and connect the jaws 60 to the bus bars. In this case, the tool first end is placed into the next slot 16B in the row, and the tool second end is moved in a direction perpendicular and towards the bus assembly until the electrical device 30 is fully engaged with the bus bar assembly 20. The levering process is complete when the jaws 60 are secured to the bus bar. The interface of the teeth 64 with the shroud 22 provides added protection from foreign objects coming into contact with the jaws 60 and the bus bars 20 during mounting of the electrical device 30 and after mounting is complete. Preferably, the interface therebetween satisfies IP2X rating. The electrical device is secured to the back pan 10 once the electrical device 30 jaws 60 are in full mechanical and electrical engagement with the corresponding bus bars and the button first end is engaged with the end of the slot 17. The electrical device 30 is secured when the opening 46 for receiving the fastener 41 is properly aligned with the back pan opening 14, allowing the fastener 41 to be secured through the opening 46 in the securement portion 34b to the back pan 10 opening 14. In one embodiment, fastener 41 is a captive fixing screw.

Figure 3A:
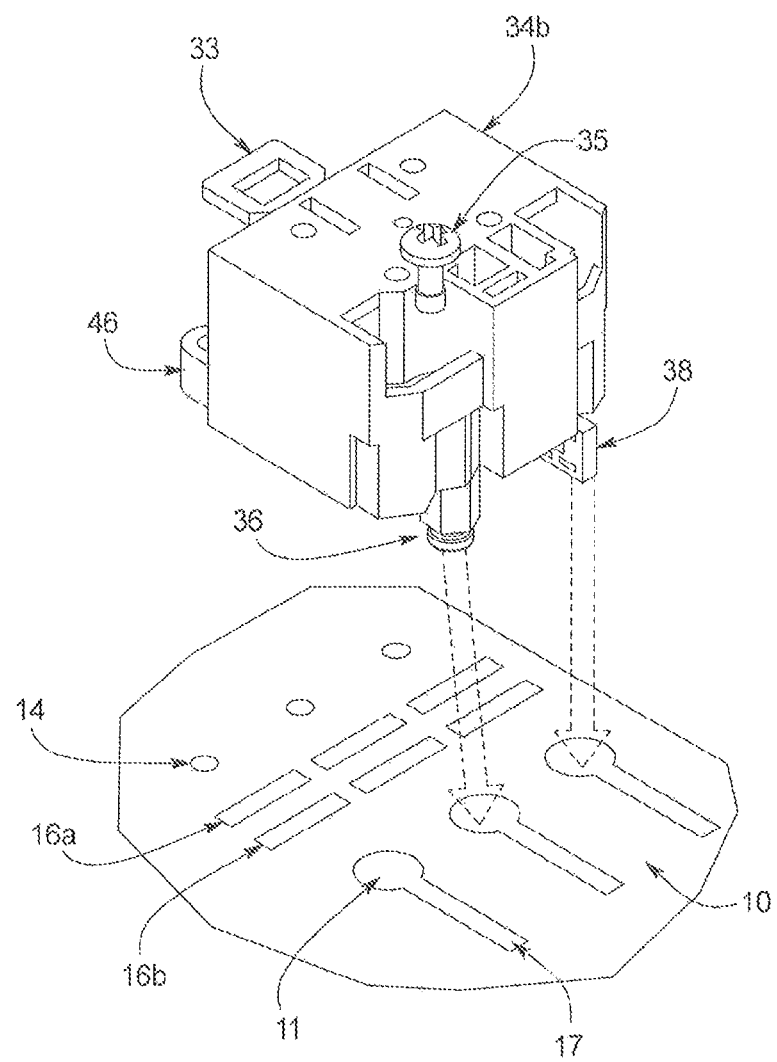
FIG. 3A shows a portion of the electrical device having the mounting button and an indexing key for mounting in the back pan.

In the embodiment additionally having an indexing key 38 as shown in FIG. 3A, the indexing key 38 and button first end 36 are simultaneously placed into the corresponding mounting positions 12 and the electrical device 30 is moved toward the bus bar assembly 20 until the indexing key 38 and button first end 36 or notch are fully engaged with the slot 17 and jaws 60 of the line side connectors 66a, 66b, 66c of the electrical device 30 are in full contact with the corresponding bus bar(s) of the bus bar assembly 20.

In an alternative embodiment, such as that shown in FIG. 3A, the securement side 34 has the button 36 as well as an indexing key 38 for locating the electrical device 30 in the desired mounting position 12 in the back pan 10.

Figure 3B:
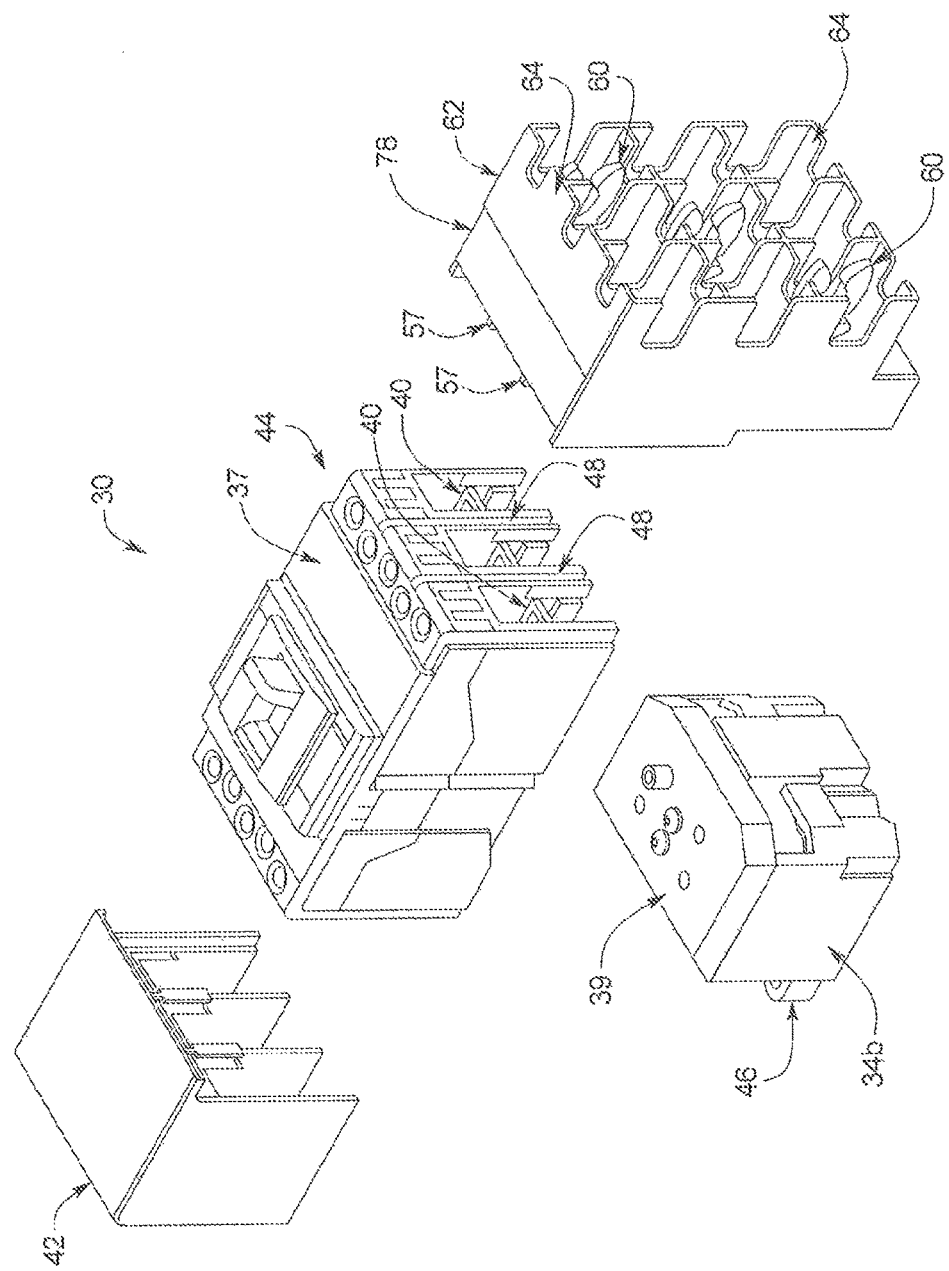
FIG. 3B is an exploded view of an embodiment of the electrical device.

With reference now to FIG. 3B, the electrical device 30 is shown having the line side connector housing 62 which houses the jaws 60 and line side connectors 66a, 66b, 66c of the electrical device 30. As shown, the teeth 64 surround the jaws 60. The line side connector housing 62 teeth 64 interface with the corresponding recesses of the shroud 22, depending on the location on the bus stack 20 to which the electrical device 30 is mounted. Preferably, the teeth 64 are integral extensions of the line side connector housing 62 as shown.

As shown in FIG. 3B, the line side connectors 66, jaws 60, line side connector housing 62 and teeth 64 may be provided as a modular line side connector 78 that a field installer can attach to a conventional circuit breaker 37 in the field. That is, the line side connectors 66, jaws 60, line side connector housing 62 and teeth 64 may be secured together as a unitary component 78 that a field installer can use to convert a conventional circuit breaker 37 in the field with threaded fasteners 74, 49. A conventional circuit breaker 37 is understood to be a circuit breaker 37 that is to be utilized either as an individually mounted unit with "cable-in/cable-out", or group mounted utilizing cables on one side and a set of loose metal conductors individually secured to the other side and then secured to the bus bars on a group mounted interior. In other words, the line side and load sides of the circuit breaker 37 are designed to be connected directly to respective electrical cables or lines with a terminal, lug or the like, or one side is connected directly to respective individual bus bars with a set of loose metal conductors individually secured to the other side and then secured to the bus bars on a group mounted interior. As used herein, the terms "cable," "line," "terminal" and "lug" are intended to be interchangeable terms. Thus, compared to special purpose circuit breakers that are manufactured within a factory with permanently attached jaws and teeth for connection to a bus bar assembly, the modular component 78 provided herein can be installed in the field on a conventional circuit breaker 37. In other words, the circuit breaker 37 is useable either with or without the modular component 78, which converts the circuit breaker 37 to a protected bus bar type circuit breaker. Thus, the choice of how to use the circuit breaker 37 and whether to use the modular line side connector 78 can be made in the field by a field installer. Preferably, the threaded fasteners 49 for attaching the modular line side connector 78 to the circuit breaker 37 are retained to the line side connector housing 62 before the modular connector 78 is attached to the circuit breaker 37 for the convenience of the field installer.

Figure 4:
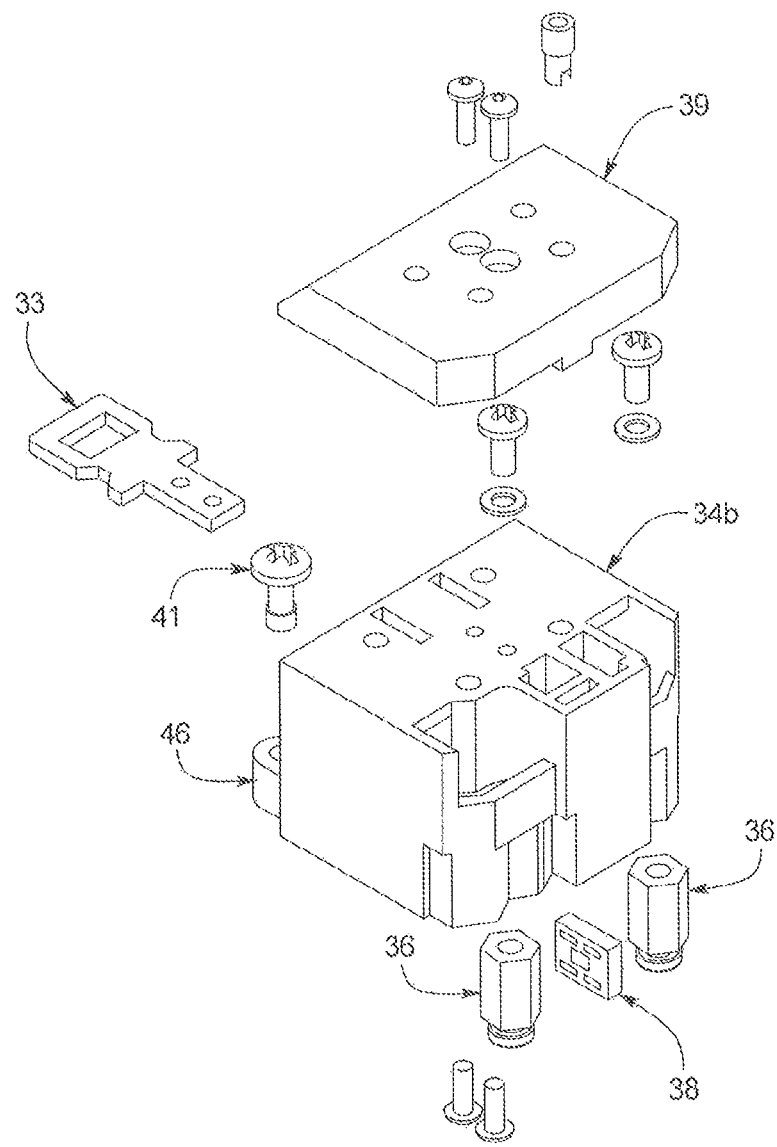
FIG. 4 is an exploded view of an alternative embodiment of the electrical device housing having two mounting buttons and an indexing key.

With reference now to FIG. 4, an embodiment is shown in which the electrical device 30 has two buttons 36 and an indexing key 38 between the two buttons 36. This type of arrangement is for larger electrical devices 30 and uses three mounting positions 12 on the back pan 10. It should be understood that each electrical device 30 may use a different number of mounting positions 12 and in some cases the housing may obscure mounting positions 12 rather than utilize the mounting positions 12.

Figure 5:
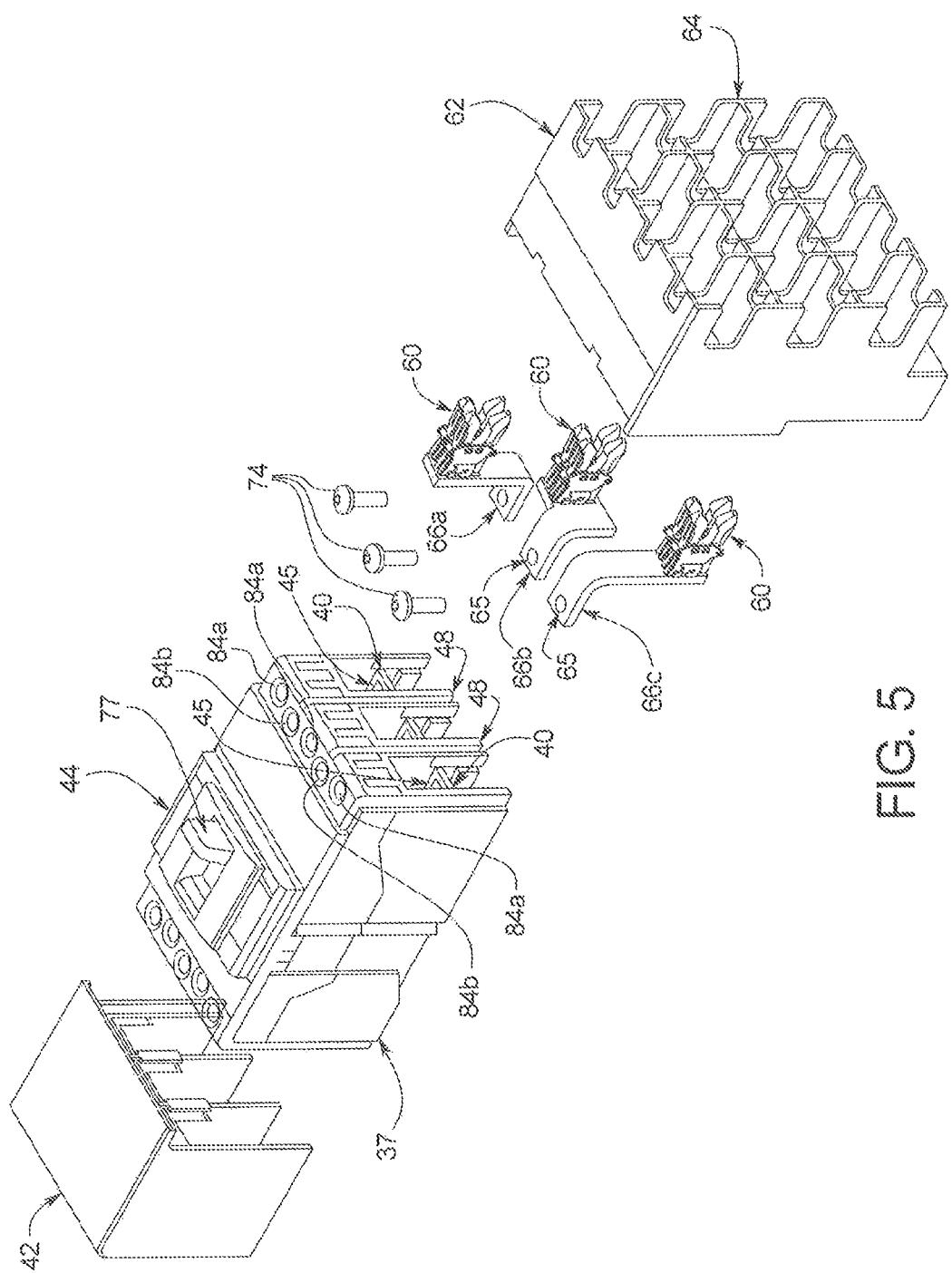
FIG. 5 is an exploded view of the electrical device having a load side housing, main housing, line side connectors, and a line side housing.

With reference now to FIG. 5, an exploded view of the electrical device 30 is shown. The electrical device 30 has the load side housing 42 which covers the load side lugs 55 (shown in FIG. 1A), the main housing 44, and the line side connector housing 62 through which the line side connector 66 and the at least one jaw 60 extends for connection with the bus bar assembly 20. The main housing 44 has line side terminals 40 to which the line side connectors 66 are connected. The line side connectors 66 are formed of any conductive metal such as copper, aluminum, bronze, or plated metal. It is understood that the line side terminals 40 may also be referred to as first electrical terminals and the load side lugs 55 may be referred to as second electrical terminals 55. The circuit breaker 37 is also provided with a conventional switch 77 between the first and second sets of electrical terminals 40, 55.

Each line side connector 66 has a first end and a second end. The first end has an opening 65 that corresponds to an opening 45 in the line side terminal 40 and a fastener 74 is placed through both openings 45, 65 to secure the respective line side connector 66 to the corresponding line side terminal 40, thereby mechanically and electrically connecting each connector 60 to one of the terminals 40. Initially, the fastener 74 is only placed through the line side terminal 40 and corresponding line side connector 66 and is later tightened through a first opening 84a in the main housing 44 after the line side housing 62 is connected to the main housing 44. Preferably, the fasteners 74 are retained to the circuit breaker 37 prior to field installation of the modular line side connector 78 for convenience of the field installer. The second end of the line side connector 66 is connected to the corresponding jaw 60 such that there is an electrical connection between each jaw 60 and connector 66.

The line side connectors 66a, 66b, 66c are staggered in relation to one another for connection with the respective phases of electricity supplied by the bus bar assembly 20. In one embodiment, line side connector 66a is bent upward for connection to the "A" phase of the bus bar assembly, line side connector 66b is bent downward for connection to the "B" phase of the bus bar assembly, and line side connector 66c is longer than line side connector 66b and is bent downward to connect with the "C" phase of the bus bar assembly. It should be appreciated by those skilled in the art, that there may be one, two, or three sets of line side connectors 66, depending on the number of electrical phases being utilized by the electrical device 30.

It should be understood that each of the line side connectors 66a, 66b, 66c may be bent upward or downward or provided as simply flat pieces mounted in any plane, but that at least one line side connector 66 of a set of three line side connectors 66 is bent in a different direction than the other two line side connectors 66 and that at least one of the three line side connectors 66 is of a different length and/or width than the other ones of line side connectors 66 in order to accommodate the desired jaw 60 placement for connection to the corresponding bus bars of the bus bar assembly 20. In one embodiment, the jaws 60 are staggered with relation to one another.

The line side connectors 66a, 66b, 66c are designed for easy installation on the electrical device line side terminals 40, requiring a single fastener to secure each line side connector 66 to the corresponding electrical device 30 line side terminal 40.

Figure 6:
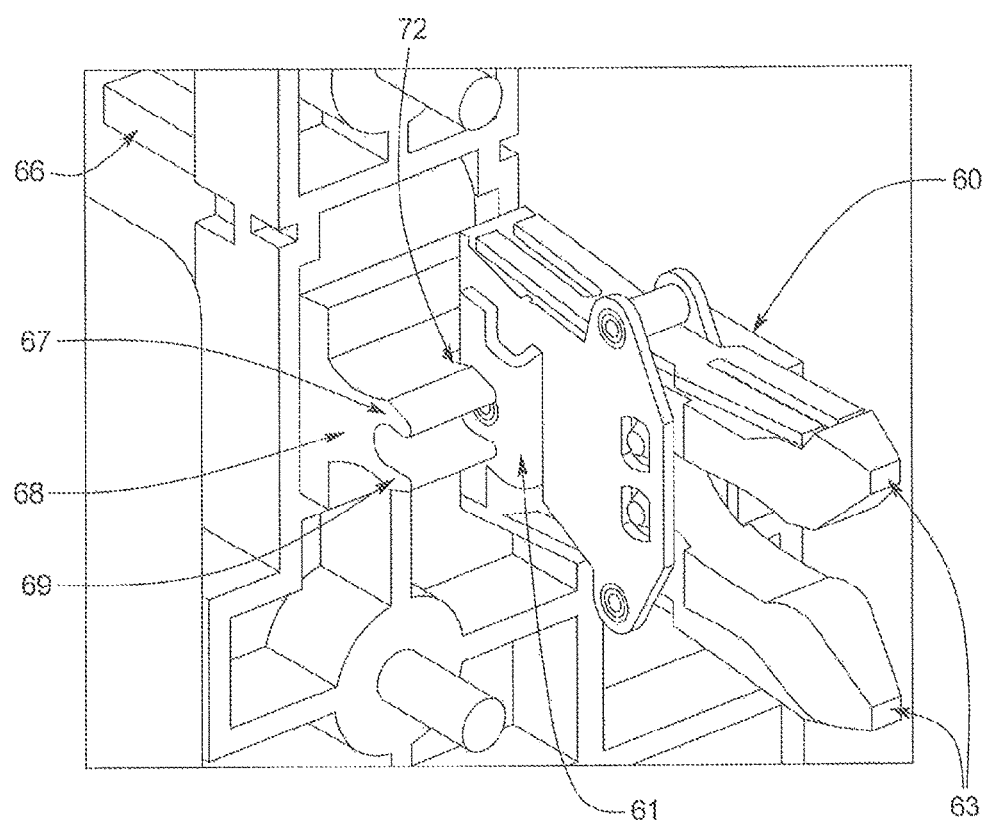
FIG. 6 shows the jaws and line side connector in detail.

With reference now to FIG. 6, the connection of the electrical device 30 jaw 60 to the line side connector 66 is shown in more detail. The electrical device 30 jaw 60 is spring loaded for a secure fit with the corresponding bus bar 19 of the bus bar assembly 20. The jaw 60 is secured to the line side connector 66 through a bracket 61 that is shaped to accommodate legs of a bridge 68. The legs 67, 69 are beveled to allow a bracket 61 of the jaws 60 to interface with the legs 67, 69. Further, the bridge 68 has a recess 72 for fixing the respective jaw 60 to the line side terminal connector 66. The jaws 60 are pressed together at jaw 60 first ends in order to open and secure jaw 60 second ends through the jaw brackets 61 to the corresponding recess 72 on the bridge 68.

In one embodiment, there are multiple recesses 72 in an elongated bridge 68. The multiple recesses 72 to allow for the placement of multiple jaws 60 and the indexing of multiple jaw 60 brackets 61 in the single elongated bridge 68. In this manner, the line side connector 66 bridge 68 may be a single component that supports multiple jaws 60 per phase in a three-phase system.

Figure 7:
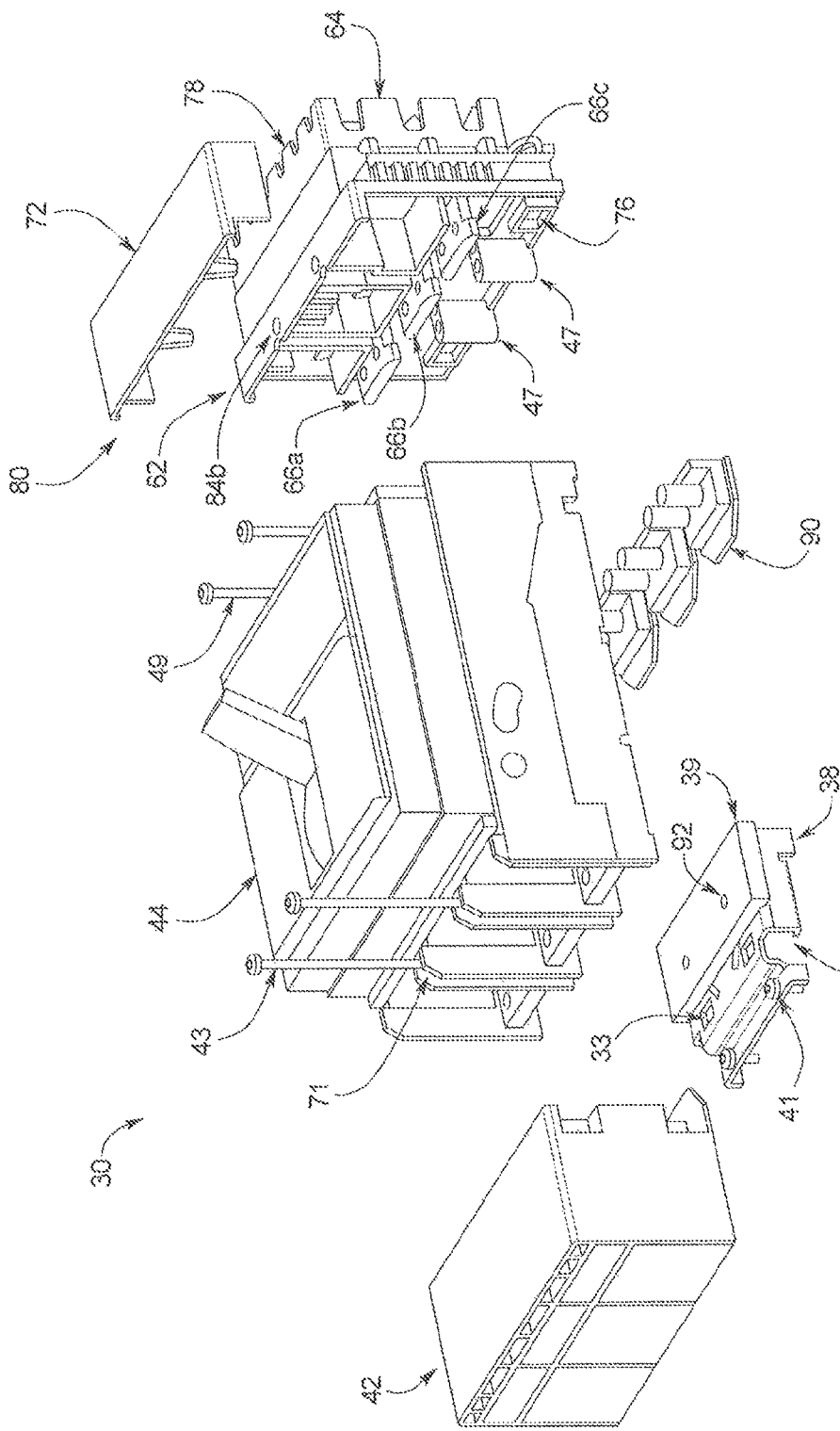
FIG. 7 is an exploded view of the electrical device having the load side housing, securement portion, main housing, and line side connector assembly.

Referring now to FIG. 7, a circuit breaker is shown as the exemplary electrical device 30 in an exploded view. The electrical device 30 has a line side connector assembly 80 having the line side connector housing 62, a cover 72, a structural frame 76 and line side connectors 66a, 66b, 66c holding jaws 60, the main housing 44, the load side housing 42 and the securement portion 34a. The line side connector housing 62 and structural frame 76 are formed of a thermoplastic material. In FIG. 7, the extension 39 is shown but it should be appreciated that not all electrical devices 30 require the extension 39.

Figure 8:
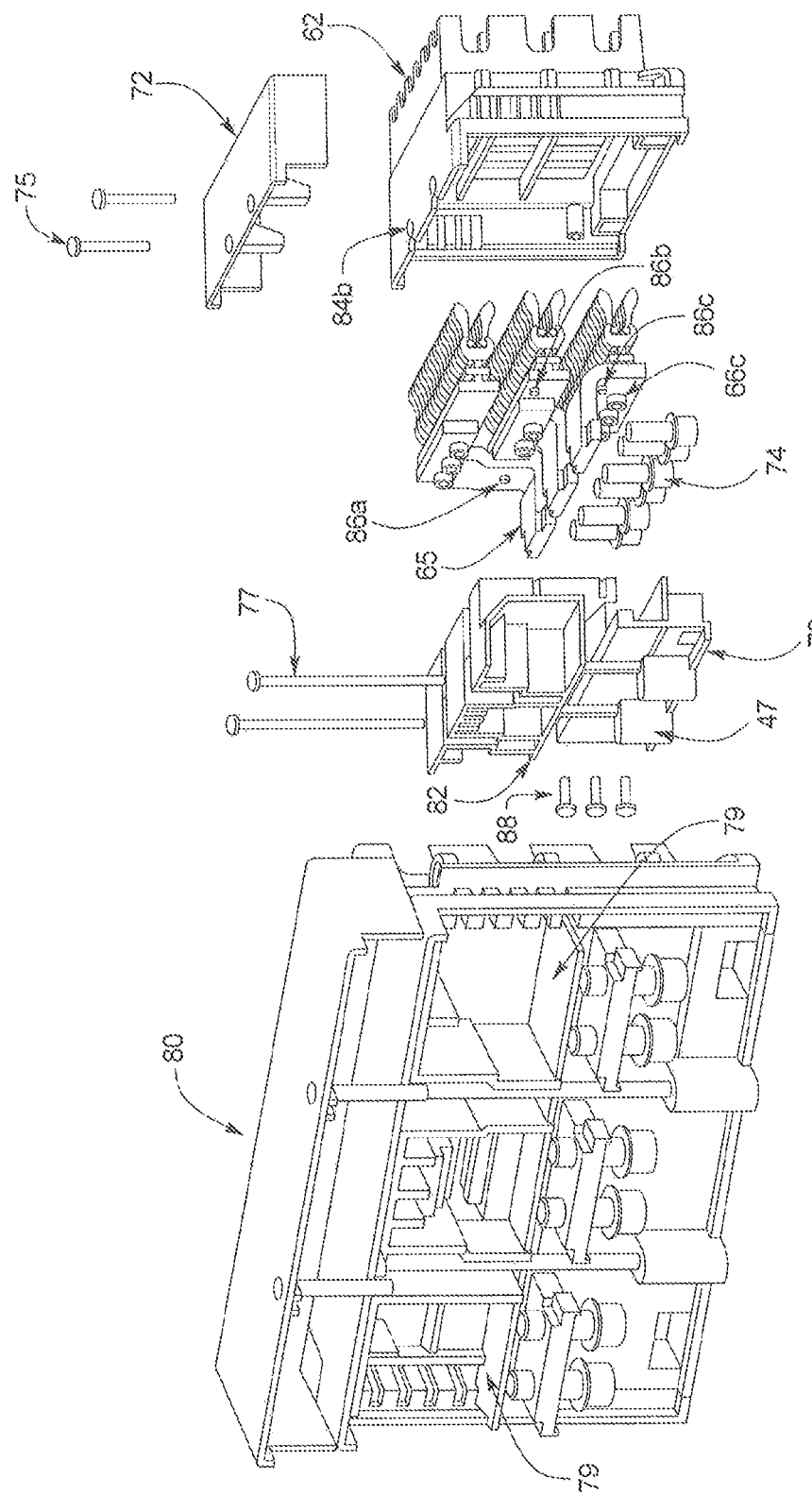
FIG. 8 shows the line side connector assembly.

With reference now to FIG. 8, the line side connector assembly 80 is shown to the left and an exploded view of the line side connector assembly 80 is shown to the right. The line side connector assembly 80 has a structural frame 76 with support members 79 to which the line side connector 66 first ends are secured using terminal fasteners 74. The line side connector 66 second ends hold jaws 60 that extend into the line side connector housing 62.

Figure 9:
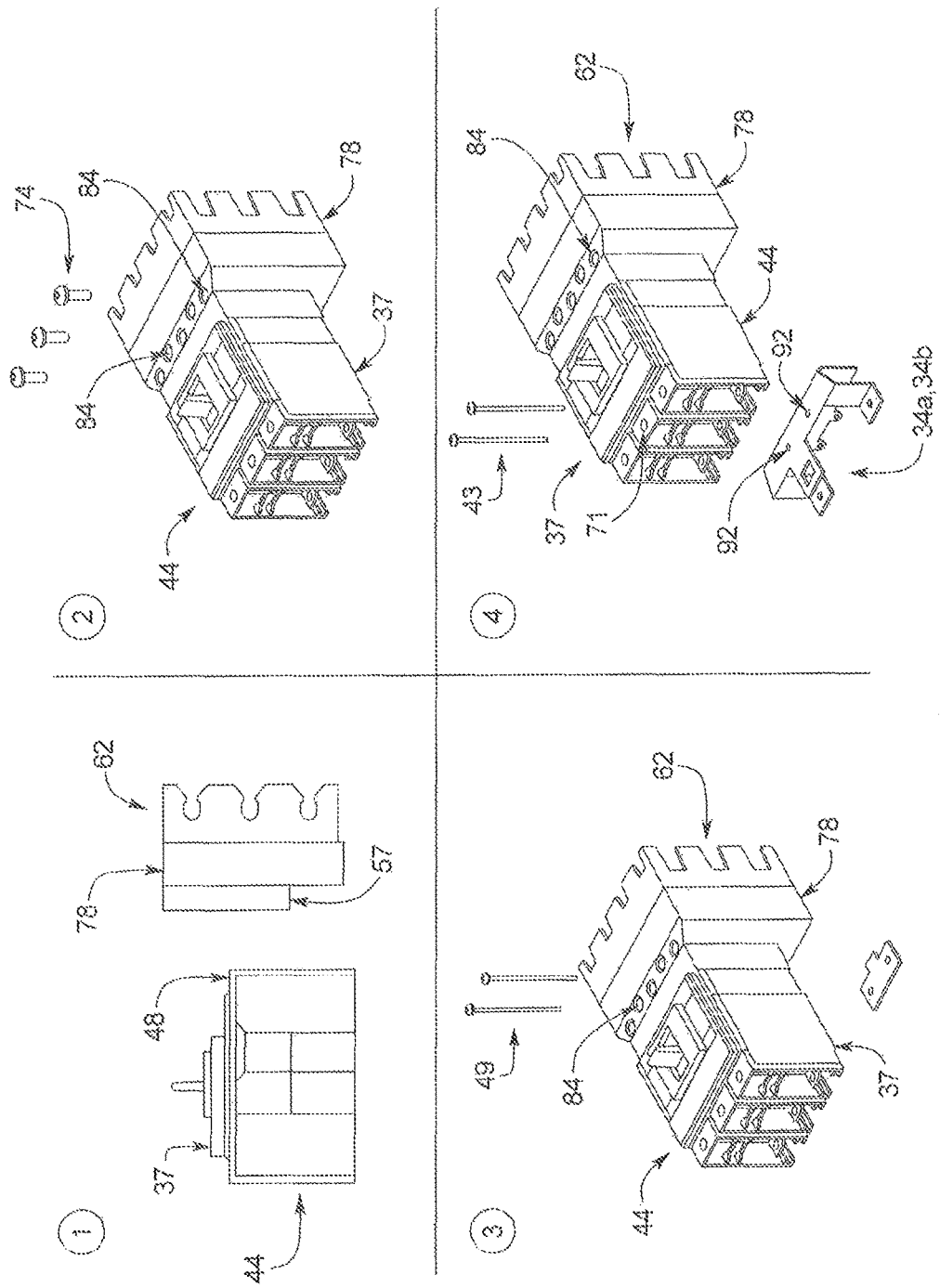
FIG. 9 shows a method of assembling the line side connector housing, main housing, and securement portion of the electrical device.

Referring now to FIGS. 7, 8 and 9, the line side connector 80 assembly is formed by securing the line side connectors 66 to the structural frame 76 and the line side connector housing 62 using fasteners 88 that extend through corresponding openings 82 in the structural frame 76, line side assembly openings 86a, 86b, 86c and line side connector housing 62, securing the structural frame 76, line side connectors 66 and line side connector housing 62 together.

With particular reference to FIG. 9, a method of assembling the electrical device having the line side connector assembly 80 has the following steps. The line side connector assembly 80 has a flanges 57 extending outwardly from the line side connector housing 62 (as additionally shown in FIG. 3b) that interface with corresponding recesses 48 of the main housing 44.

First, the line side connector assembly 80 is moved onto the main housing 44 from a position above the main housing 44. The line side connector assembly 80 is moved downward so that the flanges 57 interface with the recesses 48. It should be understood, that after the line side connector assembly 80 is secured to the main housing 44 through flanges 57 and recesses 48, the following steps may be performed in any order.

The terminal fasteners 74, or first fasteners 74, connecting the line side connectors 66a, 66b, 66c to the terminals 40 are secured and/or tightened using a tool first end through the first openings 84a in the main housing 44 (see also FIG. 5). The threaded terminal fasteners 74 are properly torqued as they are used for both a mechanical and electrical connection. Second fasteners 49 are then used to secure the line side connector assembly 80 to the main housing 44 through the second openings 84b in the top surface of the line side connector housing 62 and retaining elements 47 in the main housing 44 (see also FIG. 5). As shown in FIGS. 9-2 and 9-3, the first openings 84a in the main housing 44 remain exposed when the line side connector housing 62 is attached to the main housing 44. In the preferred embodiment, this is preferred because it allows a field installer to gain access to the fasteners 74 for connecting the connectors 66 to the terminals 40. As also shown in FIG. 9-4, a portion of the line side connector housing 62 surrounds the top surface of the main housing 44 and the side surfaces on opposite sides of the main housing 44. This arrangement provides a seal between the line side connector housing 62 and the main housing 44 to prevent foreign objects from contacting the connectors 66 and the terminals 40. Preferably, this seal satisfies UL-489 rating. Optionally, a line side cover 72 is secured to the line side connector housing 62 after attaching the line side connector housing 62 to the main housing 44. The line side cover 72 may cover the first fasteners 74 to provide additional protection if desired.

Lastly, the securement portion 34a, 34b is connected to the opposite end of the main housing 44 from the line side connector housing 62 as shown in FIG. 9-4. The securement portion 34a, 34b is connected to the bottom surface of the main housing 44 through openings 71 in the main housing 44 and openings 92 in the securement portion 34a, 34b and/or the extension 39 using threaded fasteners 43. In this manner, the line side connector assembly 80 is modular and is installable on any electrical device 30 of the present disclosure without requiring modifications to the terminals 40, main housing 44, line side connectors 66 or line side connector housing 62. It should be appreciated that for breakers of different frame sizes, the method of line side connector assembly may differ.

While the present application illustrates various embodiments, and while these embodiments have been described in some detail, it is not the intention of the applicant to restrict or in any way limit the scope of the appended claims to such detail. Additional advantages and modifications will readily appear to those skilled in the art. Therefore, the invention, in its broader aspects, is not limited to the specific details, the representative embodiments, and illustrative examples shown and described. Accordingly, departures may be made from such details without departing from the spirit or scope of the applicant's general inventive concept.

What is claimed is:

1. A modular line side connector adapted for attachment to a circuit breaker, the circuit breaker comprising a first housing, a set of line side terminals, a set of load side lugs, and a plurality of openings, the modular line side connector comprising:
   a plurality of conductive connectors adapted to be secured to respective line side terminals of the circuit breaker;
   a plurality of jaws adapted to be secured to respective bus bars, the jaws being secured to respective conductive connectors of the plurality of conductive connectors, and the jaws being spring loaded for a secure fit to the bus bars;
   a second housing which houses the jaws and conductive connectors of the plurality of conductive connectors; and
   a plurality of teeth adapted to interface with corresponding recesses of a shroud surrounding the bus bars;
   wherein the openings of the circuit breaker remain exposed when the modular line side connector is attached to the circuit breaker, the openings being adapted to permit fasteners to secure the conductive connectors of the plurality of conductive connectors to the line side terminals.

2. The modular line side connector according to claim 1, wherein the second housing and the first housing are connected together when the modular line side connector is attached to the circuit breaker, a portion of the second housing surrounding a top surface and opposing side surfaces of the first housing.

3. The modular line side connector according to claim 1, wherein the teeth are integral extensions of the second housing.

4. The modular line side connector according to claim 1, wherein the teeth surround the jaws.

5. The modular line side connector according to claim 1, wherein the second housing is formed of a thermoplastic material.

6. The modular line side connector according to claim 1, wherein the shroud is IP2X rated.

7. The modular line side connector according to claim 1, in combination with a securement portion and a threaded fastener adapted for attachment to an end of the circuit breaker opposite from the modular line side connector, the securement portion comprising a tab with an opening adapted to insert a tool to move the circuit breaker toward the bus bars, a button adapted to secure the circuit breaker to a back pan, and an opening adapted to permit the threaded fastener to secure the securement portion to the circuit breaker.

8. A modular bus stack connector adapted for attachment by a field installer to a circuit breaker in the field, the circuit breaker comprising a first housing, a set of first electrical terminals, a set of second electrical terminals, a switch disposed between the sets of first and second electrical terminals, and a plurality of first openings, the modular bus stack connector comprising:
   a plurality of connectors adapted to be mechanically secured to and electrically connected to respective first electrical terminals of the circuit breaker;
   a plurality of jaws adapted to be electrically connected to respective bus bars, the jaws being electrically connected to respective connectors of the plurality of connectors, and the jaws being spring loaded for a secure fit to the bus bars;
   a second housing which houses the jaws and respective connectors of the plurality of connectors; and
   a plurality of teeth adapted to interface with corresponding recesses of a shroud surrounding the bus bars, the teeth surrounding the jaws;
   wherein the first openings of the circuit breaker remain exposed when the modular bus stack connector is attached to the circuit breaker, the first openings being adapted to permit first fasteners to mechanically secure the connectors of the plurality of connectors to the first electrical terminals.

9. The modular bus stack connector according to claim 8, wherein the connectors, jaws, second housing and teeth are secured together as a unitary component adapted for field installation.

10. The modular bus stack connector according to claim 9, wherein the first fasteners are retained to the circuit breaker prior to field installation of the unitary component.

11. The modular bus stack connector according to claim 8, wherein the first fasteners are threaded.

12. The modular bus stack connector according to claim 8, wherein a seal is formed between the second housing and the first housing to prevent foreign objects from coming into contact with the connectors and the first electrical terminals when the modular bus stack connector is attached to the circuit breaker.

13. The modular bus stack connector according to claim 12, wherein the seal is UL-489 rated.

14. The modular bus stack connector according to claim 8, wherein the first and second housings are formed of an electrically insulated plastic material.

15. The modular bus stack connector according to claim 8, wherein the teeth interface with the shroud to prevent foreign objects from coming into contact with the jaws and the bus bars.

16. The modular bus stack connector according to claim 15, wherein the teeth and the shroud are IP2X rated.

17. The modular bus stack connector according to claim 16, wherein the teeth are integral extensions of the second housing.

18. The modular bus stack connector according to claim 8, wherein the circuit breaker further comprises a second opening, the second opening being adapted to permit a second fastener to mechanically secure the second housing to the first housing, the second fastener being threaded and being retained to the second housing prior to the bus stack connector being attached to the circuit breaker.

19. The modular bus stack connector according to claim 8, wherein the connectors, jaws, second housing and teeth are secured together as a unitary component adapted for field installation, the first fasteners are threaded, a seal is formed between the second housing and the first housing to prevent foreign objects from coming into contact with the connectors and the first electrical terminals when the modular bus stack connector is attached to the circuit breaker, the first and second housings are formed of an electrically insulated plastic material, and the teeth interface with the shroud to prevent foreign objects from coming into contact with the jaws and the bus bars.

20. The modular bus stack connector according to claim 19, wherein the first fasteners are retained to the circuit breaker prior to field installation of the unitary component, the seal is UL-489 rated, the teeth and the shroud are IP2X rated, the teeth are integral extensions of the second housing, and the circuit breaker further comprises a second opening, the second opening being adapted to permit a second fastener to mechanically secure the second housing to the first housing, the second fastener being threaded and being retained to the second housing prior to the bus stack connector being attached to the circuit breaker.

* * * * *